(12) United States Patent
Ochiai et al.

(10) Patent No.: US 9,706,761 B1
(45) Date of Patent: Jul. 18, 2017

(54) SPINNING REEL FOR FISHING

(71) Applicant: Shimano Inc., Sakai, Osaka (JP)

(72) Inventors: Koji Ochiai, Osaka (JP); Takuji Takamatsu, Osaka (JP); Satoshi Ikebukuro, Osaka (JP); Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/384,919

(22) Filed: Dec. 20, 2016

(30) Foreign Application Priority Data

Jan. 25, 2016 (JP) ................. 2016-011942

(51) Int. Cl.
*A01K 89/01* (2006.01)
(52) U.S. Cl.
CPC .............................. *A01K 89/01082* (2015.05)
(58) Field of Classification Search
CPC .............. A01K 89/01; A01K 89/01081; A01K 89/01082; A01K 89/01083; A01K 89/01086
See application file for complete search history.

(56) References Cited

U.S. PATENT DOCUMENTS 5,004,182 A * 4/1991 Councilman .......... A01K 89/01
 242/232
5,673,868 A * 10/1997 Takeuchi ............... A01K 89/01
 242/231
5,820,052 A * 10/1998 Yamaguchi ............ A01K 89/01
 242/232
2005/0082405 A1* 4/2005 Sugawara .............. A01K 89/01
 242/223
2005/0145735 A1* 7/2005 Ikuta ...................... A01K 89/01
 242/307
2011/0174909 A1* 7/2011 Shibata .................. A01K 89/01
 242/230

FOREIGN PATENT DOCUMENTS

JP 2003-274817 A 9/2003
JP 2006-101704 A 4/2006

* cited by examiner

*Primary Examiner* — Emmanuel M Marcelo
(74) *Attorney, Agent, or Firm* — Global IP Counselors, LLP (57) ABSTRACT

A spinning reel for fishing includes a rotor, a fishing line guiding mechanism, and a bail reversing mechanism. The rotor has a cylindrical portion, and first and second rotor arms disposed in opposed positions on the cylindrical portion. The fishing line guiding mechanism has a line roller to guide a fishing line, a bail, first and second bail support members supporting first and second ends of the bail, the first bail support member coupled to the first rotor arm, and the second bail support member coupled to the second rotor arm. The bail reversing mechanism inverts the fishing line guiding mechanism to line casting or line winding positions. The line roller is disposed on the first bail support member and the bail reversing mechanism is disposed inside the second rotor arm. The first rotor arm includes two support legs extending forwardly from an outer peripheral portion of the cylindrical portion.

8 Claims, 10 Drawing Sheets

SPINNING REEL FOR FISHING

CROSS-REFERENCE TO RELATED APPLICATIONS

This application claims priority based on Japanese Patent Application No. 2016-011942, filed in the Japan Patent Office on Jan. 25, 2016, the contents of each of which are hereby incorporated herein by reference.

BACKGROUND

Field of the Invention

The present invention relates to a spinning reel for fishing, in particular to a spinning reel for fishing comprising a reduced weight rotor.

Background Information

A conventional spinning reel for fishing can include a spool, a rotor that comprises a pair of rotor arms (e.g., a first rotor arm and a second rotor arm), and a fishing line guiding mechanism that is pivotably mounted to the distal ends of the pair of rotor arms (for example, Japanese Published Unexamined Application No. 2006-101704). The fishing line guiding mechanism is a mechanism for guiding the fishing line onto the spool. This fishing line guiding mechanism comprises a bail, a pair of bail support members that support the two ends of the bail, and a line roller.

When winding a fishing line onto a spool, winding is carried out via a line roller by rotating the rotor, therefore, a large load is applied to the line roller. In order to support this load, it is necessary for the first rotor arm, on which the line roller is disposed, to have sufficient strength. Increasing the strength of the first rotor arm often causes the weight of the first rotor arm to increase.

Further, an inverting mechanism for inverting the fishing line guiding mechanism between a line casting position and a line winding position is attached on the first rotor arm side. This structure is also a cause of increased weight of the first rotor arm.

It is necessary for a rotor, which rotates the first rotor arm and the second rotor arm at high speed, to achieve good rotational balance. Accordingly, when the weight of the first rotor arm is greater than that of the second rotor arm, the weight of the second rotor arm is increased in order to achieve a balance. As a result, the overall weight of the rotor is further increased.

There is prior art in which an inverting mechanism for inverting the fishing line guiding mechanism is disposed on the rotor arm side on which the line roller is not disposed, in order to reduce the weight of the rotor arm as much as possible (for example, Japanese Published Unexamined Application No. 2003-274817).

SUMMARY

According to the technology disclosed in Japanese Published Unexamined Application No. 2003-274817, the thickness of the rotor arm can be reduced by providing a bulging portion that protrudes to the spool side of a rotor arm on the side to which an inverting mechanism is disposed, disposing an inverting shaft in the bulging portion, and changing the position of the inverting shaft. Further, the bulging portion is configured to be disposed on either one of the pair of rotor arms.

An object of the technology disclosed in Japanese Published Unexamined Application No. 2003-274817 is to reduce the thickness of the rotor arm by effectively utilizing the space that is formed between the rotor arm and the spool. However, the structure of the rotor arm on the side from which the inverting mechanism is removed is not reassessed.

In recent years, with the aim to further reduce the weight of the spinning reel for fishing, a spinning reel for fishing has been in demand in which the rotor is reduced in weight by utilizing the benefits of moving the inverting mechanism from the rotor arm on the side on which the line roller is disposed.

The present invention was made in order to solve the problem described above, and an object thereof is to provide a spinning reel for fishing having a rotor that is reduced in weight, by moving an inverting mechanism from the rotor arm on the side on which the line roller is disposed.

The spinning reel for fishing according to the present invention comprises a rotor, a fishing line guiding mechanism, and a bail reversing mechanism.

The rotor has a cylindrical portion, and a first rotor arm and a second rotor arm disposed in mutually opposed positions on the cylindrical portion.

The fishing line guiding mechanism has a line roller that guides a fishing line, a bail, a first bail support member that supports one end of the bail, and a second bail support member that supports the other end of the bail, in which the first bail support member is coupled to the first rotor arm, and the second bail support member is coupled to the second rotor arm.

The bail reversing mechanism inverts the fishing line guiding mechanism between a line casting position and a line winding position. The line roller is disposed on the first bail support member and the bail reversing mechanism is disposed inside the second rotor arm. The first rotor arm comprises two support legs that extend forwardly from the outer peripheral portion of the cylindrical portion.

Preferably, the support legs comprise a ribbed reinforcement portion that extends from the side of at least one support leg to the outer peripheral portion of the cylindrical portion.

Preferably, the bail reversing mechanism comprises a return lever that returns the second bail support member to the line winding position, and a return unit that abuts the rear end portion of the return lever and moves the return lever, is disposed at a position of a front flange portion of the reel body that faces the rear end portion of the cylindrical portion, to which a rod support portion extends.

Preferably, a biasing member that abuts the front end of the return lever and biases the return lever in the forward direction is disposed on the second bail support member.

Preferably, the bail reversing mechanism comprises a toggle spring and a guide rod that guides the toggle spring, and an insulating member is disposed in an engagement hole of the second bail support member and engages one end portion of the guide rod, in order to insulate the space between the guide rod and the engagement hole.

Preferably, a rotor balance adjustment unit is disposed on the outer peripheral portion of the cylindrical portion at the first rotor arm.

Preferably, a thick-walled reinforcement portion that is thicker than the surroundings is disposed on the inner peripheral portion of the cylindrical portion at a position on which the first rotor arm is disposed.

Preferably, an inclined reinforcement portion that extends inclined with respect to the cylinder axis direction of the cylindrical portion is disposed on the side surface of the cylindrical portion.

According to the present invention, it is possible to provide a spinning reel for fishing having a rotor that is reduced in weight, by moving the inverting mechanism from the rotor arm on the side on which the line roller is disposed.

BRIEF DESCRIPTION OF THE DRAWINGS

Referring now to the attached drawings which form a part of this original disclosure.

DETAILED DESCRIPTION OF THE EMBODIMENTS

First Embodiment

Figure 1:
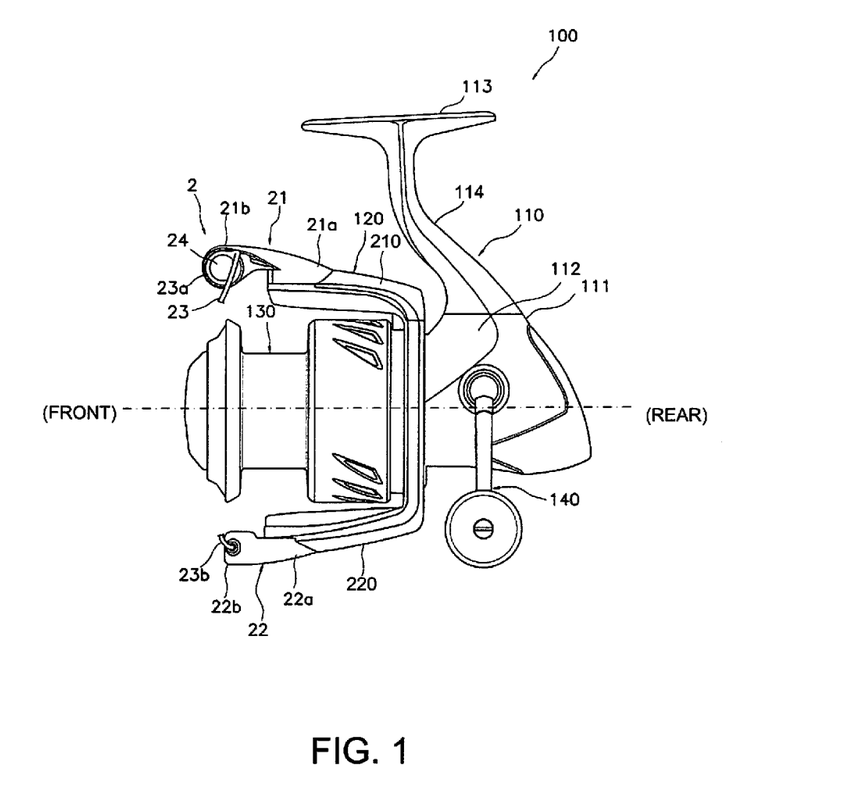
FIG. 1 is an overall side view of a spinning reel for fishing according to a first embodiment of the present invention.
Figure 2:
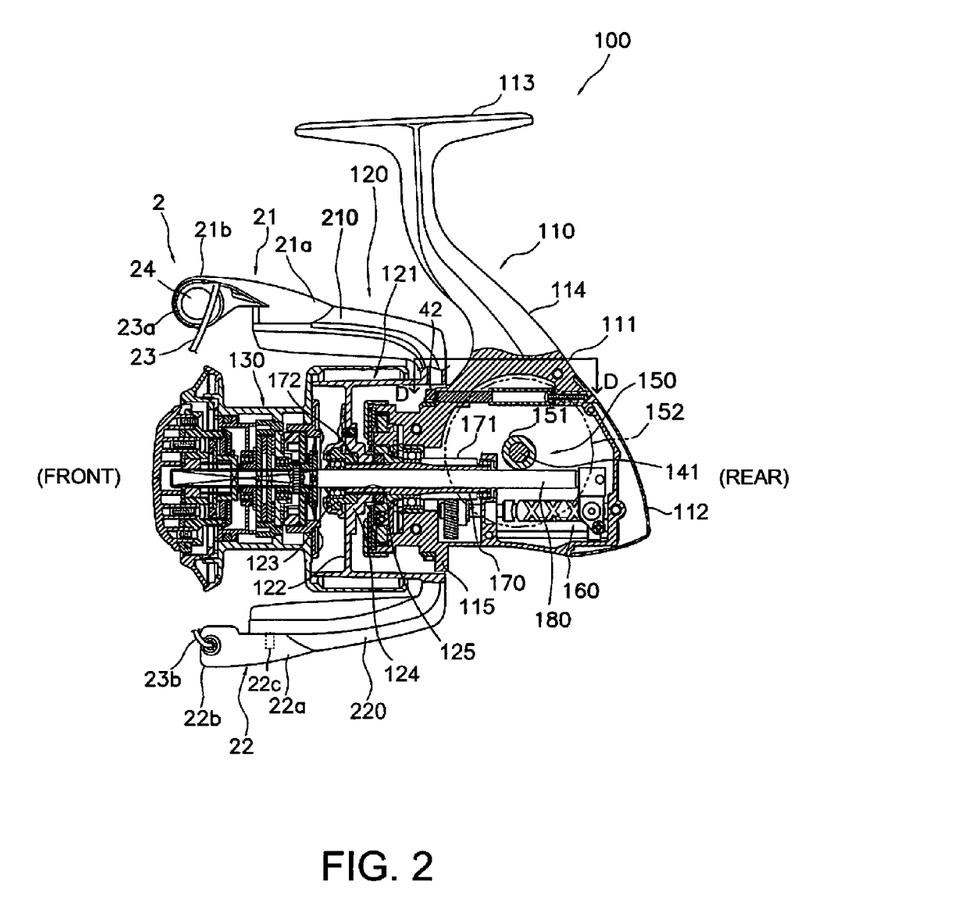
FIG. 2 is a cross-sectional view of the spinning reel for fishing as shown in FIG. 1.

The spinning reel for fishing according to the first embodiment of the present invention will be described, with reference to the drawings. In the following description, "front (ward)" indicates the direction in which the fishing line is cast (unreeled); specifically, left in FIG. 1 and FIG. 2 is the "front (ward)" direction. The opposite direction thereof is referred to as "rear (ward)." In addition, the material of each member is not limited to the examples; well-known materials having the necessary function and durability may be appropriately used.

As shown in FIG. 1, the spinning reel 100 for fishing comprises a reel body 110, a rotor 120, a spool 130, a handle 140, and a fishing line guiding mechanism 2. Further, as shown in FIG. 2, the spinning reel 100 for fishing further comprises a drive mechanism 150, an oscillating mechanism 160, a pinion gear 170, and a spool shaft 180.

As shown in FIG. 1, the reel body 110 comprises a case part 111 and a lid portion 112. The lid portion 112 can be detached from the case part 111. In addition, a rod support portion 114 is formed extending in the case part 111, and a rod mounting stage 113 is disposed at the distal end of the rod support portion 114. The rod mounting stage 113 is a portion that is mounted to the fishing rod.

As shown in FIG. 2, the reel body 110 comprises an internal space that is defined by the case part 111 and the lid portion 112, and houses various mechanisms in the internal space. In particular, the drive mechanism 150 and the oscillating mechanism 160 are housed in the reel body 110.

The drive mechanism 150 comprises a drive shaft 151 and a drive gear 152. The drive shaft 151 is coupled to a handle shaft 141 and is integrally rotated with the handle shaft 141.

The drive gear 152 is coupled to the drive shaft 151 and is integrally rotated with the drive shaft 151. The drive gear 152 is a face gear and meshes with the gear portion 171 of the pinion gear 170. The drive shaft 151 and the drive gear 152 are rotated by rotating the handle 140 that is mounted to the side surface of the reel body 110, and the pinion gear 170 is also rotated.

The pinion gear 170 is disposed in the reel body 110. The pinion gear 170 is formed in a tubular shape, and the spool shaft 180 extends through the inside of the pinion gear 170. The pinion gear 170 is rotatably disposed around the spool shaft 180. The pinion gear 170 is supported in the reel body 110 via a plurality of axle bearing members.

The spool shaft 180 extends forward from inside the reel body 110. The spool shaft 180 is reciprocated in a longitudinal direction by rotating the handle 140. In particular, the rotation of the handle 140 rotates the pinion gear 170 via the drive gear 152. Accompanying the rotation of this pinion gear 170, the oscillating mechanism 160 reciprocates the spool shaft 180 in the longitudinal direction.

The spool 130 is a member onto which the fishing line is wound. The spool 130 is supported to the distal end portion of the spool shaft 180. The spool 130 is integrally reciprocated with the spool shaft 180 in the longitudinal direction.

The rotor 120 is a member for winding the fishing line onto the spool 130. The rotor 120 is rotatably supported on the reel body 110 via the pinion gear 170. Specifically, the rotor 120 is fixed to the front portion 172 of the pinion gear 170, and is integrally rotated with the pinion gear 170. The rotor 120 comprises a rotor body portion (cylindrical portion) 121, a first rotor arm 210, and a second rotor arm 220. The detailed structure of the rotor 120 will be described later.

Figure 3:
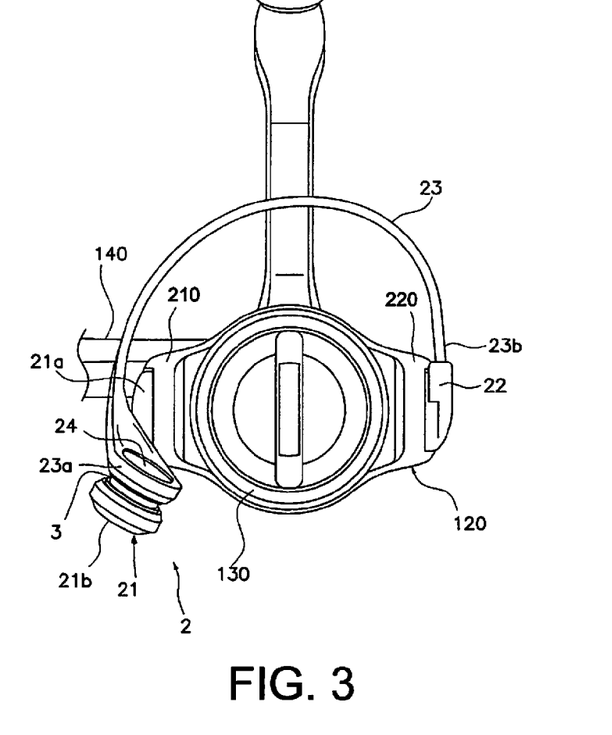
FIG. 3 is a front view of the spinning reel for fishing as shown in FIG. 1.

As shown in FIGS. 1-3, the fishing line guiding mechanism 2 is a mechanism for guiding the fishing line onto the spool 130. The fishing line guiding mechanism 2 is attached across the distal end portions of the first rotor arm 210 and the second rotor arm 220.

This fishing line guiding mechanism 2 comprises a first bail support portion 21, a second bail support portion 22, a bail 23, a support shaft 24, and a line roller 3. The fishing line guiding mechanism 2 is pivotably mounted to assume the line winding position in which the handle 140 is turned to wind the fishing line onto the spool 130, and a line casting position in which the fishing line is unreeled forward from the spool 130.

The first bail support member 21 is made of zinc, and is pivotably mounted on the first rotor arm 210. Specifically, the first bail support member 21 is pivotably mounted to the outside of the front end portion of the first rotor arm 210.

The second bail support member 22 is made of zinc, and is pivotably mounted on the second rotor arm 220. Specifically, the second bail support member 22 is pivotably mounted on the outside of the front end portion of the second rotor arm 220.

Figure 4:
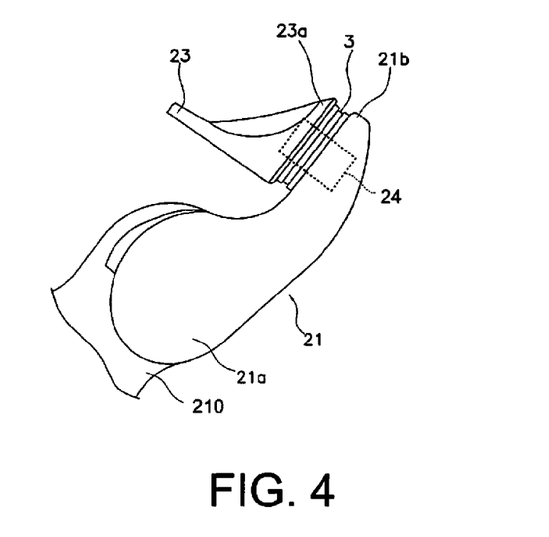
FIG. 4 is a partial, enlarged view of the fishing line guiding mechanism of the spinning reel for fishing as shown in FIG. 1.

As shown in FIG. 4, the first bail support member 21 comprises a first end portion 21a and a second end portion 21b The first end portion 21a is pivotably mounted on the first rotor arm 210. The second end portion 21b of the first bail support member 21 supports the first end portion 23a of the bail 23 via the support shaft 24.

As shown in FIG. 1 and FIG. 2, the second bail support member 22 comprises a first end portion 22a and a second end portion 22b. The first end portion 22a is pivotably mounted on the second rotor arm 220. The second end portion 22b supports the second end portion 23b of the bail 23.

As shown in FIG. 3, the bail 23 is a member curved in a substantially U-shape, and made of, for example, stainless steel alloy. The bail 23 is curved to protrude outwards along the outer peripheral portion surface of the spool 130. This first end portion 23a of the bail 23 is supported on the first bail support portion 21 via the support shaft 24.

Further, the second end portion 23b of the bail 23 is supported on the second bail support portion 22. When the fishing line guiding mechanism 2 is in the line winding position, the bail 23 guides the fishing line onto the line roller 3 via the first end portion 23a. The line roller 3 is a member for guiding the fishing line onto the spool 130 of the spinning reel 100 for fishing. When the handle 140 is manually turned when the fishing line guiding mechanism 2 is in the line winding position, the rotor 120 is rotated and the fishing line is wound onto the spool 130 via the line roller 3.

The overall configuration of the spinning reel 100 for fishing is described above. Details of the rotor 120 will be described next.

Figure 5A:
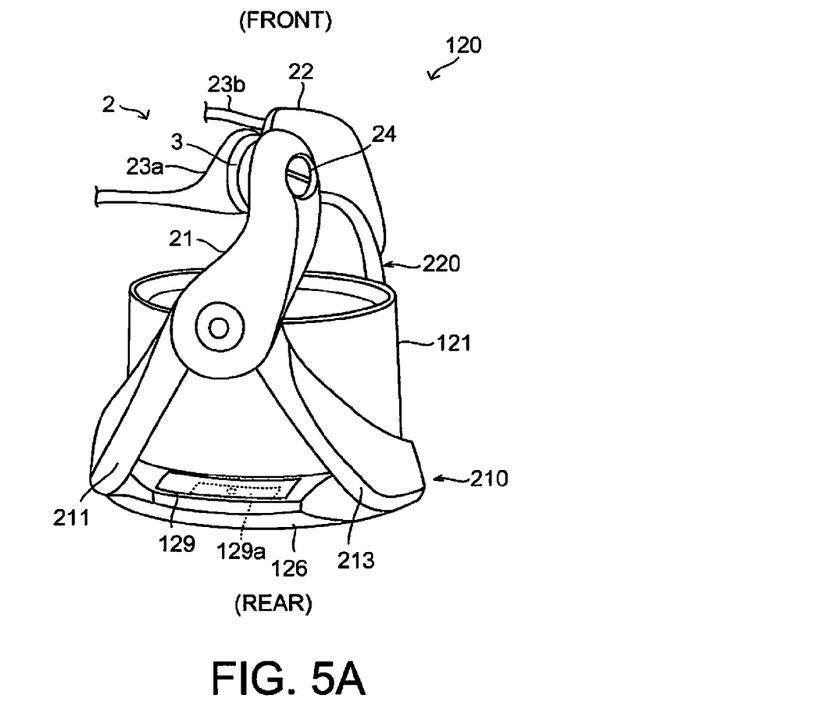
FIG. 5A is a perspective view of a rotor comprising the fishing line guiding mechanism of the spinning reel for fishing as shown in FIG. 1, seen from the first rotor arm side.
Figure 5B:
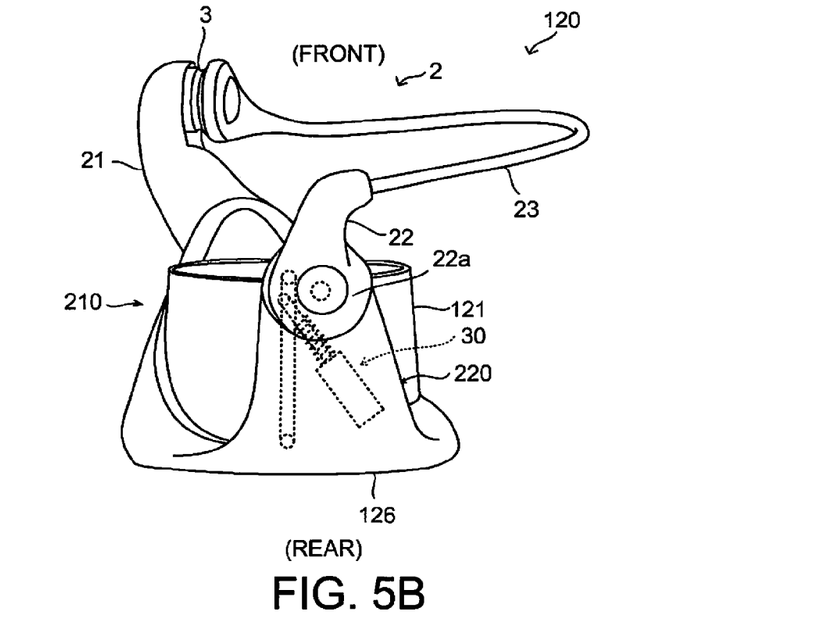
FIG. 5B is a perspective view seen from the second rotor arm side.

As shown in FIGS. 5A and 5B, the rotor 120 comprises a rotor body portion 121, a first rotor arm 210, and a second rotor arm 220. In FIGS. 5A and 5B, the vertical direction of the drawing is the longitudinal direction of the spinning reel 100.

Figure 6A:
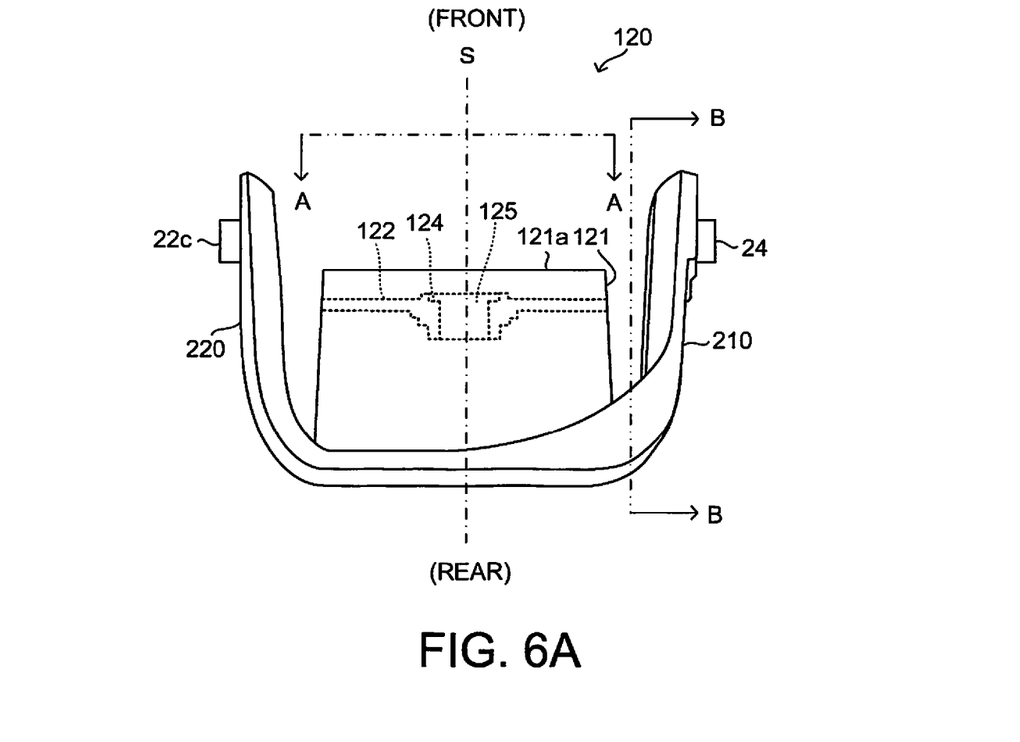
FIG. 6A is a side view of the rotor shown in FIGS. 5A and 5B.
Figure 6B:
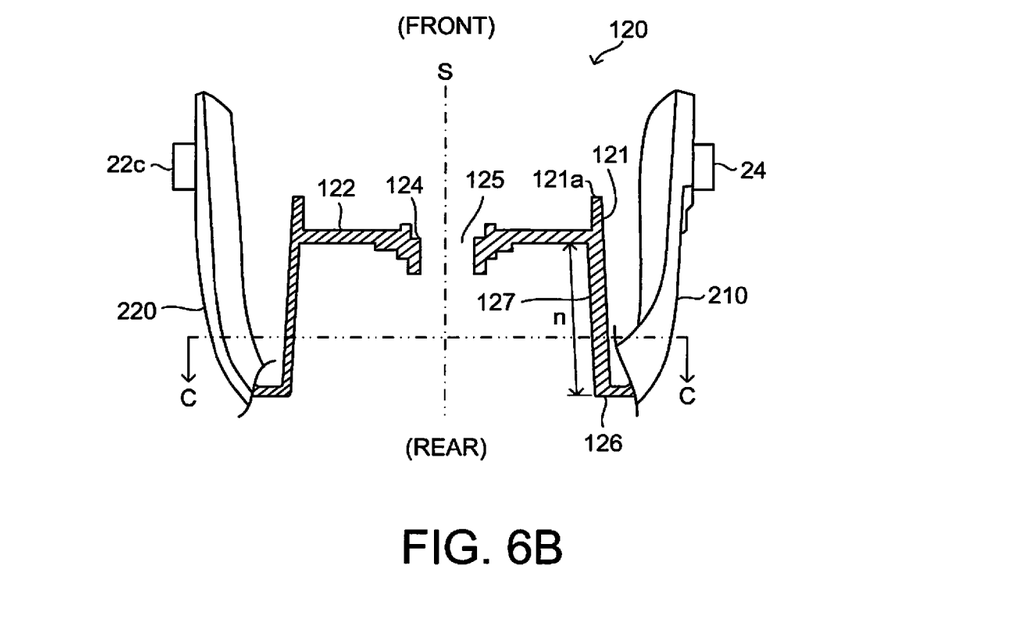
FIG. 6B is a schematic cross sectional view taken along line A-A of the rotor body portion shown in FIG. 6A.

The rotor body portion 121 of the rotor 120 will be described using FIGS. 6A and 6B and FIG. 7. As shown in FIGS. 6A and 6B, the rotor body portion 121 comprises a cylindrical shape that extends longitudinally, in which the diameter is slightly reduced toward the front. As shown in FIG. 6B, the rear end portion 126 of the rotor body portion 121 is open. The outer peripheral portion side of the rear end portion 126 protrudes like a flange around the entire peripheral portion to increase the strength so as to be capable of supporting the first rotor arm 210 and the second rotor arm 220. In FIGS. 6A and 6B, the vertical direction of the drawing is the longitudinal direction of the spinning reel 100.

A disk portion 122 having a surface that is perpendicular to the cylinder axis (center axis of the cylinder) S of the rotor body portion 121 is formed on the inner side of the rotor body portion 121 that is slightly retracted from the front end 121a. A boss portion 124 is formed in the center of the disk portion 122. A circular through-hole 125 is formed in the central portion of the boss portion 124, and the front 172 of the above-described pinion gear 170, as well as the spool shaft 180, extend through the through-hole 125.

As shown in FIG. 2, the rotor 120 is fixed to the front 172 of the pinion gear 170 by a nut 123, at the front of the disk portion 122. When the user turns the handle 140, the drive gear 152 is rotated, and the pinion gear 170 that is meshed with the drive gear 152 and disposed around the spool shaft 180 is rotated. Then, the rotor 120 is rotated along with the rotation of the pinion gear 170.

Returning to FIG. 6B, a thick-walled portion 127 (first reinforcement portion) with a thicker wall than the surroundings (other positions) is disposed on the inner side of the rotor body portion 121 in the cylinder axis S direction, in a position at which the first rotor arm 210 is formed, which is rearward of the disk portion 122. The shape of the thick-walled portion 127 is rectangular having sides that are substantially parallel to the cylinder axis S.

Figure 7:
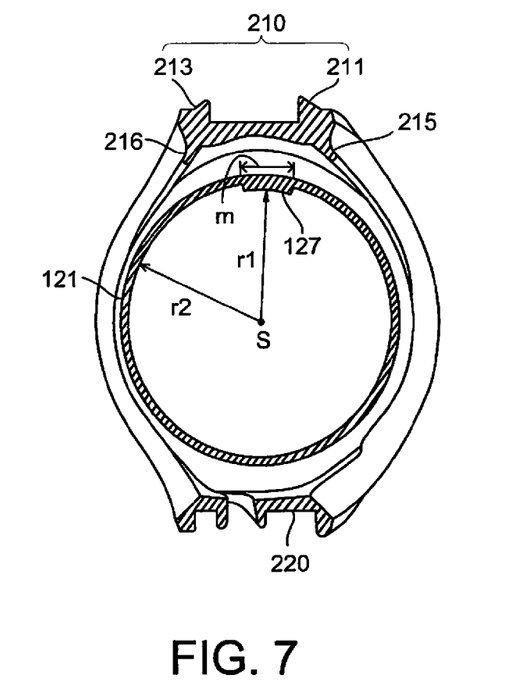
FIG. 7 is a schematic cross sectional view taken along line C-C in FIG. 6B.

As shown in FIG. 7, the circumferential position of the thick-walled portion 127 preferably overlaps the circumferential position of the first rotor arm 210 from the point of view of strength and rotational balance. For example, the central position of the first rotor arm 210 in the circumferential direction preferably matches the central position of the thick-walled portion 127 in the circumferential direction. Similarly, for reasons of strength and rotational balance, the shape of the thick-walled portion 127 is preferably line-symmetrical in the circumferential direction. Line-symmetrical in the circumferential direction here means that the left and right of the rotor body portion 121 in the circumferential direction is line-symmetrical, with respect to a virtual line in the cylinder axis S direction.

The radius r1 of the inner surface of the thick-walled portion 127 (the distance from the cylinder axis S of the rotor body portion 121 to the inner surface of the thick-walled portion 127, inner radius) is smaller than the inner radius r2 of the other positions of the rotor body portion 121. That is, while the outer diameter of the rotor body portion 121 is the same for the thick-walled portion 127 and the other positions, the thick-walled portion 127 is formed protruding in the radially inward direction such that the thickness is increased compared to the other positions of the rotor body portion 121.

The circumferential width m of the thick-walled portion 127 is smaller than the distance between the positions from where the first support leg 211 and the second support leg 213 extend. However, the circumferential width of the thick-walled portion 127 may be formed to be larger than the distance between the positions from where the first support leg 211 and the second support leg 213 extend. While it is a trade-off between strength and weight, the radial thickness (wall thickness) of the thick-walled portion 127 is preferably about 1.5 to 3 times the wall thickness of the cylinder of the rotor body portion 121 besides the thick-walled portion 127. The length n of the thick-walled portion 127 in the cylinder axis S direction (refer to FIG. 6B) is preferably the total length from the rear end portion 126 of the rotor body portion 121 (open end) to the disk portion 122, but may be shorter than this.

Load is applied to the rotor body portion 121 in the respective positions to which the first rotor arm 210 and the second rotor arm 220 are attached. In particular, since a first bail support portion 21 having a line roller 3 that guides the fishing line is attached to the first rotor arm 210, the first rotor arm 210 side of the rotor body portion 121 receives the tensile force of the fishing line and a large load is applied thereto. Accordingly, a thick-walled portion 127 is provided, in which the wall thickness of the cylinder of the rotor body portion 121 is increased at the position to which the first rotor arm 210 is attached, in order to increase the structural strength against load. Then, the wall thickness of the cylinder at other positions of the rotor body portion 121 is formed thinner than the thickness of the case in which a thick-walled portion 127 is not provided and the entire cylinder of the rotor body portion 121 is formed to have a uniform thickness. As a result, it is possible to further reduce the weight of the entire rotor body portion 121 while maintaining the necessary structural strength.

The shape of the thick-walled portion 127 is rectangular, but the shape does not necessarily have to be rectangular. For example, the circumferential width of the thick-walled portion 127 may be different between the rear end and the front end. However, it is preferable from the point of strength and rotational balance that the shape is symmetrical in the circumferential direction.

The thick-walled portion 127 may be integrally formed with the rotor body portion 121, or formed by being producing separately from the rotor body portion 121 and subsequently attached to the rotor body portion 121. Further, when separately forming the thick-walled portion 127 and the rotor body portion 121, the material thereof may be varied. For example, a material with a greater material strength than the rotor body portion 121 may be used for the thick-walled portion 127.

Meanwhile, the thick-walled portion 127 is not formed on the rotor body portion 121 on the second rotor arm 220 side. However, the thick-walled portion 127 may also be formed on the rotor body portion 121 on the second rotor arm 220 side. In this embodiment as well, the thickness should be determined such that the rotation is balanced, giving consideration to the weight of the first rotor arm 210 side and the thickness of the rotor body portion 121.

As shown in FIGS. 5A and 5B, a balance adjustment unit 129 for adjusting the rotational balance is disposed in the rear end portion 126 of the rotor body portion 121 on the first rotor arm 210 side. The balance adjustment unit 129 is capable of, for example, screw-fixing the necessary number of, for example, small metal plate members 129a (weight material for adjustment, balance).

The first bail support portion 21 and the second bail support portion 22 are, for example, made of cast zinc, but the weights thereof are likely to vary from the designed weight values. If the weights vary, there is the possibility that rotational balance cannot be achieved. In such a case, it is possible to adjust the rotational balance by attaching the necessary number of plate members 129a for balancing the rotation.

Details of the first rotor arm 210 and the second rotor arm 220 will be described next. As shown in FIGS. 5A and 5B and FIGS. 6A and 6B, the first rotor arm 210 and the second rotor arm 220 respectively extend radially outwardly from the outer peripheral portion of the rear end portion 126 of the rotor body portion 121, and further extend away from the rotor body portion 121 toward the front. The first rotor arm 210 and the second rotor arm 220 are disposed in opposite positions (facing each other) in the circumferential direction of the rotor body portion 121. The rotor body portion 121, the first rotor arm 210, and the second rotor arm 220 are made of, for example, aluminum alloy or magnesium alloy.

As shown FIG. 5A, the first rotor arm 210 comprises a flat plate-shaped first support leg 211 and a flat plate-shaped second support leg 213. The first support leg 211 and the second support leg 213 respectively extend radially outwardly from the outer peripheral portion of the rear end portion 126 of the rotor body portion 121, and further extend away toward the front while being curved. The first support leg 211 and the second support leg 213 are closer to each other toward the front, and are merged at the front end portions. A space is formed between the first support leg 211 and the second support leg 213. The first bail support portion 21 is coupled to the front end portion of the first rotor arm 210.

Figure 8:
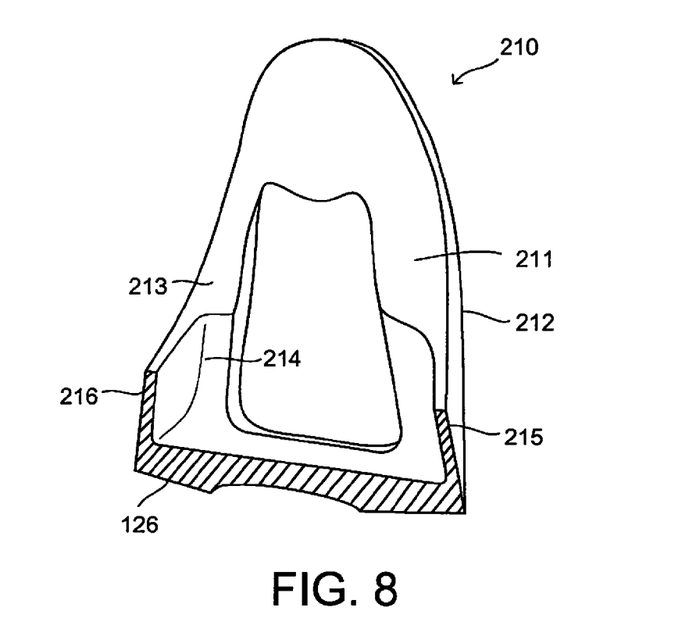
FIG. 8 is a schematic cross sectional view taken along line B-B in FIG. 6A.

As shown in FIG. 8, the first rotor arm 210 comprises a first rib 215 (third reinforcement portion) that extends from the side (side end portion) 212 of the first support leg 211. The first rib 215 extends to the outer peripheral portion of the rotor body portion 121 (outer peripheral portion of the rear end portion 126). Further, the first rotor arm 210 comprises a second rib 216 (third reinforcement portion) that extends from the side (side end portion) 214 of the second support leg 213. The second rib 216 extends to the outer peripheral portion of the rotor body portion 121 (outer peripheral portion of the rear end portion 126).

As shown in FIG. 8, the first rib 215 is formed substantially perpendicular to the first support leg 211, from the side 212 thereof. That is, the strength of the first support leg 211 is increased by forming an L-shaped cross sectional structure with the first support leg 211 and the first rib 215. Similarly, the second rib 216 is formed substantially perpendicular to the second support leg 213, from the side 214 thereof. That is, the strength of the second support leg 213 is increased by forming an L-shaped cross sectional structure with the second support leg 213 and the second rib 216.

In a conventional rotor arm, a plate-like member extends radially outwardly from the rear end portion 126 of the rotor body portion 121, and further extends forward while being curved. However, a rib that extends from the plate-like member in a perpendicular direction (such that the cross section becomes L-shaped) is not provided, and strength is ensured as a single wide, thick, plate-like member. In contrast, in the first rotor arm 210 according to the first embodiment, the weight of the entire first rotor arm 210 is reduced while maintaining the strength by respectively combining a first rib 215 and a second rib 216 to a thinly formed, plate-like first support leg 211 and second support leg 213.

The reason for forming the first rotor arm 210 from two support legs, the first support leg 211 and the second support leg 213, is to reduce the weight of the component members of the first rotor arm 210 as much as possible. In addition, the reason for providing a first rib 215 to the first support leg 211 and a second rib 216 to the second support leg 213 is to maintain the necessary strength by respectively reinforcing the first support leg 211 and the second support leg 213. According to such a configuration, it is possible to reduce the weight compared to a case in which the first rotor arm 210 is formed of a single wide, thick, support leg, as well as to ensure the necessary strength. Meanwhile, since a bail reversing mechanism 30 (described later) is not disposed on the first rotor arm 210, it is easier to employ such a configuration. The number of support legs may be three or more.

On the other hand, as shown in FIG. 5B, the second rotor arm 220 extends thick-walled radially outwardly from the rear end portion 126 of the rotor body portion 121 in a position that opposes the first rotor arm 210 (positioned symmetrically with respect to the cylinder axis S), and further extends forward (substantially parallel to the rotor body portion 121) while being curved. The second rotor arm 220 is wide at the extended portion (base portion), and formed such that the width becomes narrower toward the front end. The second bail support portion 22 is coupled to the front end portion of the second rotor arm 220.

As shown by the dotted lines in FIG. 5B, a bail reversing mechanism 30 is disposed inside the portion of the second rotor arm 220 that extends forwardly. As described above, the fishing line guiding mechanism 2 of the spinning reel 100 for fishing can assume a line winding position, in which the fishing line is wound onto the spool 130, and a line casting position, in which the fishing line is freely unreeled forward (cast) from the spool 130. The bail reversing mechanism 30 is a device for allocating (inverting) the fishing line guiding mechanism 2 (in particular the second bail support portion 22 thereof) between the line winding position and the line casting position, and stabilizing the mechanism at the respective positions.

Figure 9A:
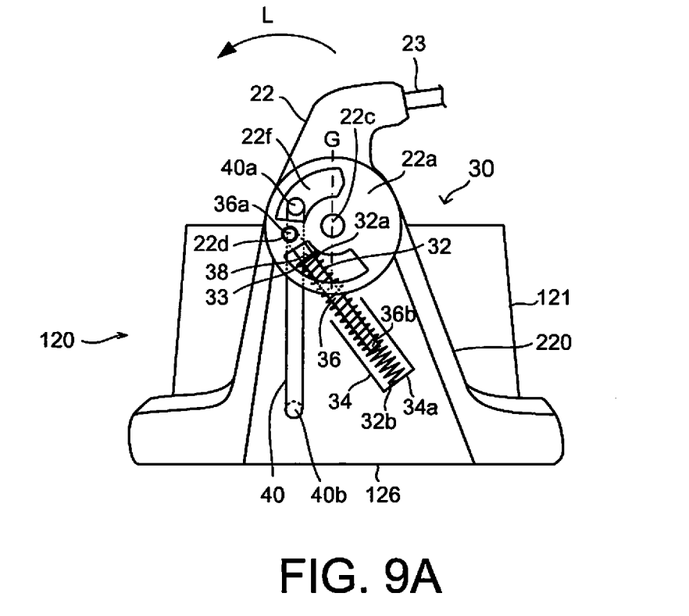
FIG. 9A is a schematic view of the bail reversing mechanism according to the first embodiment of the present invention in the line winding position.

As shown in FIG. 9A, the bail reversing mechanism 30 comprises a toggle spring 32, a guide rod 36, and a return lever 40.

The first end portion 22a of the second bail support portion 22 is made of zinc, and is coupled to the front end portion of the second rotor arm 220 by a support shaft 22c. An engagement hole 22d that engages one end 36a of the guide rod 36 and a lever insertion hole 22f in which one end 40a of the return lever 40 is inserted, are provided in the first end portion 22a.

The guide rod 36 is a member that transmits the biasing force of the toggle spring 32 to the second bail support portion 22. The guide rod 36 is made of stainless steel, with one end 36a bent at a right angle and engaging the engagement hole 22d of the first end portion 22a. The guide rod 36 includes a locking projection 38 that locks the one end portion 32a of the toggle spring 32 in front of the bent position. The other end portion 36b of the guide rod 36 is inserted halfway into the toggle spring 32. However, the other end portion 36b of the guide rod 36 does not abut the bottom surface 34a of the spring guide 34, even if the toggle spring 32 is compressed.

Figure 9B:
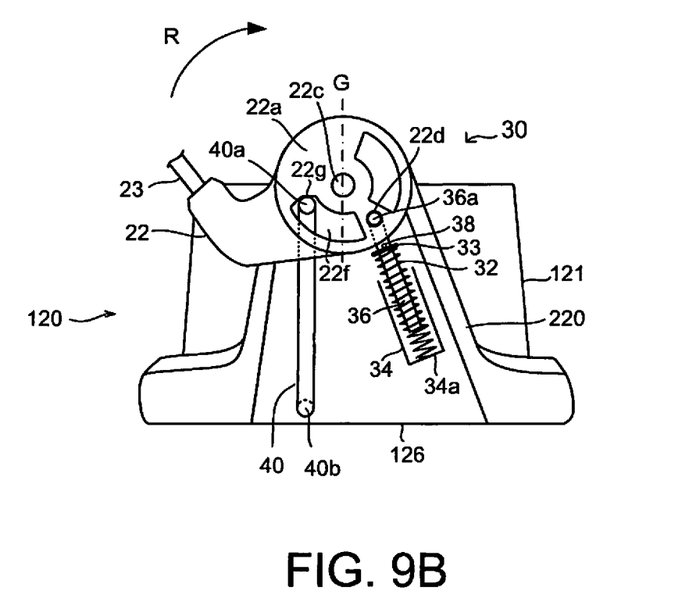
FIG. 9B is a schematic view of the bail reversing mechanism when in the line casting position.

The toggle spring 32 has the role of biasing the guide rod 36. The toggle spring 32 is a coil spring, one end portion 32a of which is locked to the locking projection 38 of the guide rod 36 via a resin plate 33, and the other end portion 32b of which is made of resin and inserted in a spring guide 34, a bottomed quadrangular prism-shaped vessel, and abutted and supported on the bottom surface 34a of the spring guide 34. The central portion of spring guide 34 is rotatably supported such that the orientation thereof is varied accompanying changes in the orientation of the guide rod 36. In FIGS. 9A and 9B, the spring guide 34 is illustrated such that the inside is visible.

One end portion 36a of the guide rod 36 is engaged with the engagement hole 22d of the first end portion 22a. The guide rod 36, biased by the toggle spring 32, thereby biases the first end portion 22a in the forward direction. The first end portion 22a of the second bail support portion 22 is stabilized in the line winding position or the line casting position by this biasing force.

Figure 10:
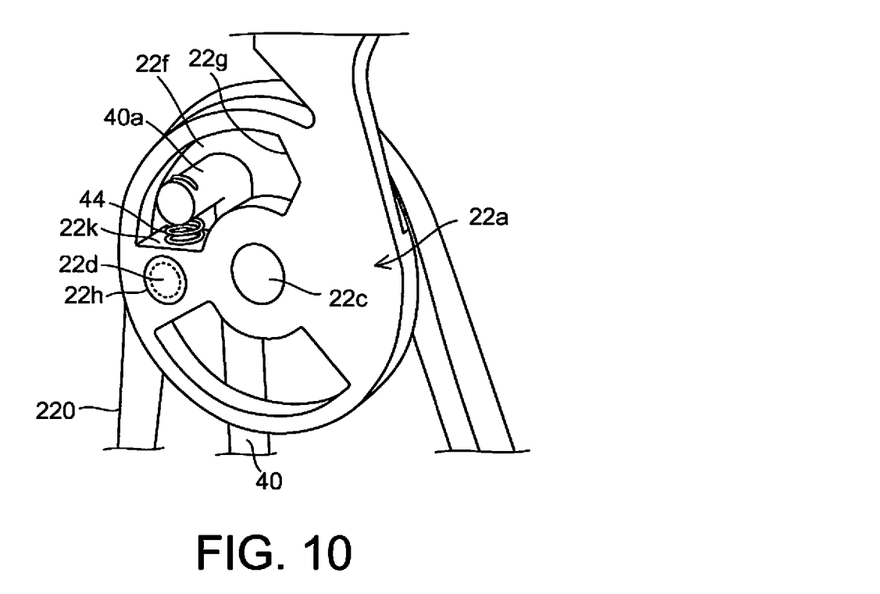
FIG. 10 is a partial perspective view of the bail reversing mechanism according to the first embodiment of the present invention.

Although the guide rod 36 is engaged with the engagement hole 22d of the first end portion 22a, since the guide rod 36 (made of stainless steel) and the first end portion 22a (made of zinc) have different materials and, if engaged directly, there is the risk that the engagement hole 22d will be corroded due to the difference in the ionization tendency of the two materials when salt water, etc., intrudes into a gap. Accordingly, as shown in FIG. 10, a cylindrical resin collar (insulating member) 22h is fitted in the engagement hole 22d of the first end portion 22a of the second bail support portion 22. The one end portion 36a of the guide rod 36 is engaged with the engagement hole 22d via resin collar 22h. The occurrence of electrolytic corrosion is prevented by inserting resin collar 22h and insulating the two in this manner. Meanwhile, the guide rod 36 is not shown in FIG. 10.

The return lever 40 is a member for transmitting a force for rotating the first end portion 22a of the second bail support portion 22 that is in the line casting position, in the direction to return to the line winding position. As shown in FIG. 9A and FIG. 10, one end portion 40a of the return lever 40 is bent at a right angle and inserted into the lever insertion hole 22f of the first end portion 22a.

The other end portion 40b of the return lever 40 is bent at a right angle in the opposite side of the one end portion 40a. The other end portion 40b of the return lever 40 is positioned forwardly of the rear end portion 126 of the rotor 120, when the first end portion 22a is in the line winding position. However, as shown in FIG. 9B, the other end portion 40b of the return lever 40 is retracted to the vicinity of the rear end portion 126 of the rotor body portion 121, when the first end portion 22a is in the line casting position. That is, the other end portion 40b of the return lever 40 approaches a front flange portion 115 of the reel body 110 (refer to FIG. 2) that faces the rear end portion 126 of the rotor body portion 121.

Figure 11:
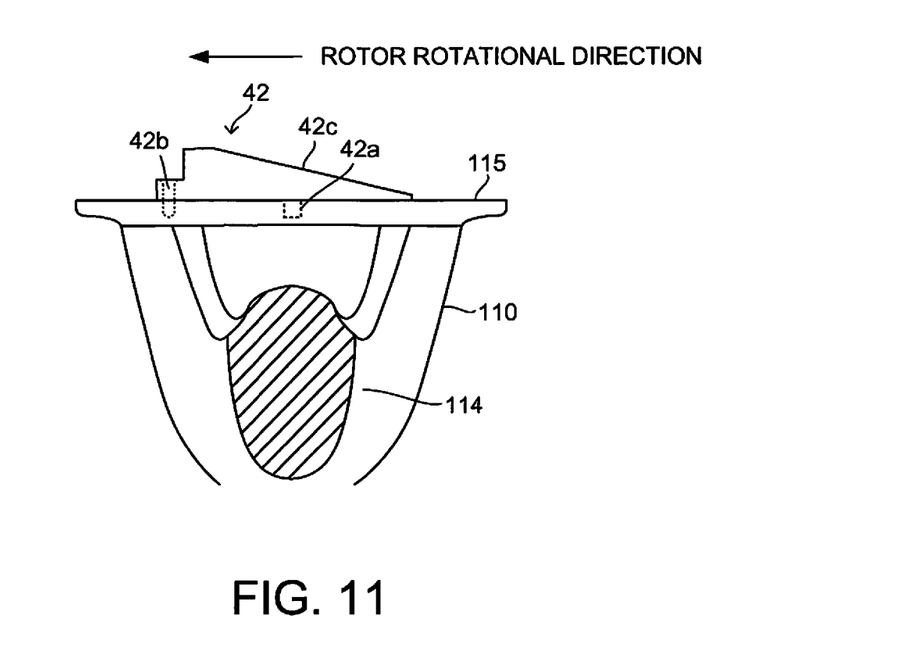
FIG. 11 is a schematic cross sectional view taken along line D-D in FIG. 2.

As shown in FIG. 11, a return unit 42 is disposed on the front flange portion 115 of the reel body 110. The return unit 42 is a substantially triangular member in which an inclined surface 42c is formed such that the height thereof becomes higher toward the rotational direction of the rotor 120. A projection 42a is formed on the bottom surface of the return unit 42, and the projection 42a is inserted in a hole in the front flange portion 115 of the reel body 110. The return unit 42 is positioned by the projection 42a, and further fixed by bolt 42b.

In the prior art, a constricted portion is generally formed in the lower part of the return unit, which is fixed by inserting the constricted portion into a notched portion disposed in to the front flange portion from the side. However, this return unit 42 is positioned and fixed by a bolt 42b and a projection 42a formed on the bottom surface. With this configuration, it is possible to simplify the structure around the front flange portion 115, which increases the freedom in design of the peripheral members.

As shown in FIG. 11, the return unit 42 is disposed on a front flange portion 115 of the reel body 110 at a position to which the rod support portion 114 extends.

When trying to manually switch the fishing line guiding mechanism 2 from the line winding position to the line casting position, the user will often hold the fishing line by hooking the line with a finger of the right hand, and move the bail 23 with the left hand to switch the positions. At this time, in order for the user to hook the fishing line with a finger, it is necessary to move the bail 23 in a position where the first rotor arm 210 having the line roller 3 comes to the rod side (the side to which the rod support portion 114 is disposed). At this time, if the return unit 42 is on the opposite position of the rod side, the second rotor arm 220 also comes to the opposite position of the rod side; therefore, the return lever 40 that is disposed inside the second rotor arm 220 interferes with the return unit 42, and the bail 23 cannot be moved to the line casting position.

By disposing the return unit 42 on the front flange portion 115 at a position to which the rod support portion 114 extends, when the user tries to manually switch the fishing line guiding mechanism 2 from the line winding position to the line casting position in a position at which the first rotor arm 210 comes to the rod side, the return lever 40 does not interfere with the return unit 42, and it is possible to switch the positions of the fishing line guiding mechanism 2 without imparting discomfort to the user.

While the one end portion 40a of the return lever 40 is inserted in the lever insertion hole 22f of the first end portion 22a of the second bail support portion 22 when in the line winding position, the one end portion 40a does not abut the side wall of the lever insertion hole 22f, and there is a space that allows a certain degree of freedom for movement. Consequently, for example, when the bail 23 is deformed, there is the possibility that the return lever 40 can be moved backward even if the first end portion 22a is in the line winding position. If the return lever 40 is moved backward in a position in which the first end portion 22a is in the line winding position, a possibility arises in which the other end portion 40b of the return lever 40 comes into contact with the return unit 42, when contact should not occur.

In order to eliminate such possibilities, the bent one end portion 40a of the return lever 40 is biased by a lifting coil spring (biasing member) 44, as shown in FIG. 10. The lifting spring 44 biases the return lever 40 forward such that the return lever 40 is not retracted.

The front end (upper end in FIG. 10) of the lifting spring 44 is locked by being wound onto the one end portion 40a of the return lever 40, and the rear end (lower end in FIG. 10) is configured to abut the side wall 22k of the rear end (lower end in FIG. 10) of the lever insertion hole 22f, when in the line winding position. According to this configuration, the lifting spring 44 is capable of biasing the return lever 40 forward (upward in FIG. 10) with respect to the first end portion 22a of the second bail support portion 22 when in the line winding position, such that the return lever 40 does not come into contact with the return unit 42.

The operation of the bail reversing mechanism 30 will be described next. As shown in FIG. 9A, when the fishing line guiding mechanism 2 is in the line winding position, the one end portion 36a of the guide rod 36 is on the left side of an imaginary line segment G that passes through the center of the support shaft 22c of the second bail support portion 22 and that is parallel to the longitudinal direction. With the biasing force of the toggle spring 32, the guide rod 36 biases the second bail support portion 22 in the upper left direction of the drawing, and stabilizes the second bail support portion 22 in this position.

When putting the fishing line guiding mechanism 2 in the line casting position in order to cast the fishing line in a forward direction, the user holds the bail 23 with a hand and turns the bail in the direction of arrow L in FIG. 9A. The second bail support portion 22 is thereby rotated counterclockwise around the support shaft 22c. While the biasing force of the toggle spring 32 acts to suppress this rotation, the engagement hole 22d (along with the one end portion 36a of the guide rod 36 which is engaged therewith) is rotated counterclockwise against the biasing force of the toggle spring 32.

The position where the engagement hole 22d is rotated halfway (not shown), and the center of the support shaft 22c, the engagement hole 22d, and the guide rod 36 that is engaged with the engagement hole 22d form a straight line, becomes the dead center of the bail reversing mechanism 30. When in the dead center position, the biasing force of the toggle spring 32 is received by the support shaft 22c, and does not act in a direction to rotate the second bail support portion 22 to either the left or to the right.

When the engagement hole 22d is further rotated counterclockwise beyond the dead point (moving rightward in the drawing), the biasing force of the toggle spring 32 then acts in a direction to rotate the second bail support portion 22 in the opposite, counterclockwise direction. The second bail support portion 22 is then rotated counterclockwise to the line casting position shown in FIG. 9A. In this position, the one end portion 36a of the guide rod 36 is on the right side of the imaginary line segment G. In addition, the one end portion 40a of the return lever 40 is pushed to the front end wall 22g of the lever insertion hole 22f, and the return lever 40 is moved downwardly. The other end portion 40b of the return lever 40 is positioned in proximity to the front flange portion 115 of the reel body 110, which is not shown, as described above.

When the fishing line guiding mechanism 2 is in the line casting position shown in FIG. 9A, if the user turns the handle 140 to wind the fishing line, the rotor 120 is rotated. Then, the other end portion 40b of the return lever 40 that rotates along with the rotor 120 abuts the inclined surface 42c of the return unit 42 (refer to FIG. 11), and is gradually lifted upwardly along the inclination of the inclined surface 42c following the rotation of the rotor 120. The other end portion 40a of the return lever 40 thereby pushes the front end wall 22g of the lever insertion hole 22f upwardly in the drawing. Accordingly, the second bail support portion 22 is rotated around the support shaft 22c, in the direction shown by the arrow R in FIG. 9B.

While the engagement hole 22d is rotated clockwise against the biasing force of the toggle spring 32 at the beginning of rotation, when the engagement hole 22d is further rotated and passes the dead point, the biasing force of the toggle spring 32 then acts in a direction to rotate the second bail support portion 22 in the clockwise direction. Then, the second bail support portion is stabilized in the line winding position shown in FIG. 9B. By turning the handle 140 in this manner, the fishing line guiding mechanism 2 is automatically set in the line winding position.

In the rotor 120 of a spinning reel 100 for fishing according to the first embodiment described above, while the other configurations are the same, the rotor body portion 121 is more lightweight while maintaining the necessary strength compared to those having a conventional structure in which the wall thickness is uniform without having a thick-walled portion 127. In addition, the first rotor arm 210 is formed from a flat plate-shaped first support leg 211 and a flat plate-shaped second support leg 213, respectively provided with a first rib 215 and a second rib 216 for reinforcement. Accordingly, while other configurations are the same, the rotor arm is further reduced in weight while maintaining the necessary strength, compared to those having a conventional structure that does not comprise a first rib 215 and a second rib 216 for reinforcement.

Additionally, the spinning reel 100 for fishing includes a bail reversing mechanism 30 inside the second rotor arm 220 on the opposite side of the first rotor arm 210, which is on the side where the line roller 3 is present. This structure makes it is easier to achieve a balance in weight between the first rotor arm 210 and the second rotor arm 220, thereby reducing the weight of the rotor 120.

Specifically, since the first rotor arm 210 does not comprise a bail reversing mechanism 30, the first rotor arm is more lightweight than the second rotor arm 220, which comprises a bail reversing mechanism 30, while the other configurations are the same. Accordingly, it is easier to achieve a rotational balance, even if a thick-walled portion 127 is not disposed on the rotor body portion 121 on the second rotor arm 220 side and a thick-walled portion 127 is disposed only on the rotor body portion 121 on the first rotor arm 210 side. In other words, it is possible to reduce the amount of weight material for adjustment (balance), which is added only to achieve a balance, resulting in a reduction in weight.

As described above, the rotor 120 of a spinning reel 100 for fishing is a rotor that achieves a rotational balance and reduces the weight of the whole while maintaining the necessary strength.

Meanwhile, the configuration to provide a thick-walled portion 127 on the rotor body portion 121 on the first rotor arm 210 side, and the configuration to form the first rotor arm 210 from a flat plate-shaped first support leg 211 and a flat plate-shaped second support leg 213 and to respectively provide a first rib 215 and a second rib 216 thereto, may each be selectively executed.

In addition, the configuration to provide a bail reversing mechanism 30 inside the second rotor arm 220 on the opposite side from the line roller 3, the configuration to provide a thick-walled portion 127 on the rotor body portion 121 on the first rotor arm 210 side, and the configuration to form the first rotor arm 210 from a flat plate-shaped first support leg 211 and a flat plate-shaped second support leg 213, and to respectively provide a first rib 215 and a second rib 216 thereto, may each be selectively executed, or two or more may be executed in combination.

Second Embodiment

In the first embodiment, a thick-walled portion 127 is formed on the inner side of the cylinder of the rotor body portion 121 on the first rotor arm 210 side, and the thickness of the other portions of the cylinder of the rotor body portion 121 is reduced, to reduce the overall weight of the rotor body portion 121. In the second embodiment, a mode in which the overall weight of the rotor body portion 121A is reduced by another configuration will be described.

Figure 12A:
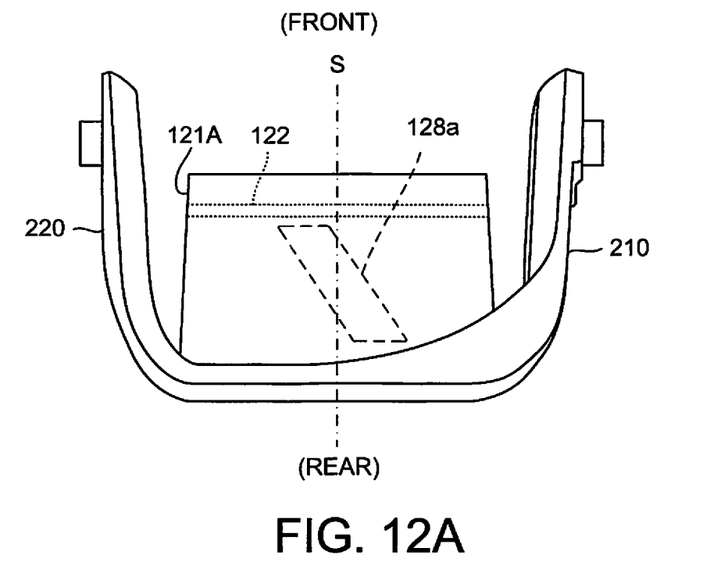
FIG. 12A is a side view of the rotor of a spinning reel for fishing according to a second embodiment of the present invention.
Figure 12B:
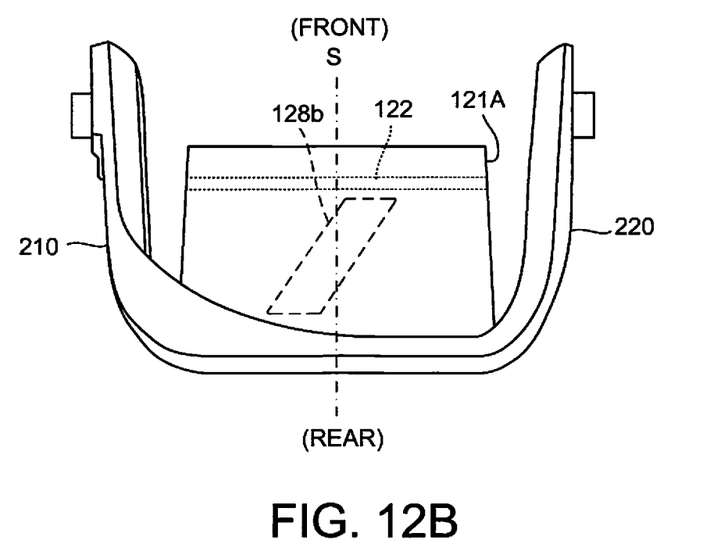
FIG. 12B is a side view seen from the opposite side.

As shown in FIGS. 12A and 12B, an inclined thick-walled portion 128a (second reinforcement portion) and an inclined thick-walled portion 128b (second reinforcement portion) having thicker walls than the surroundings, which extend inclined with respect to the cylinder axis S direction, are provided from the rear to the front of the side surface of the rotor body portion (cylindrical portion) 121A, between the first rotor arm 210 and the second rotor arm 220. Extending inclined with respect to the cylinder axis S direction means extending on the cylinder side surface of the rotor body portion 121A in a partial spiral form (helical arc).

The inclined thick-walled portions 128a and 128b are portions in which the wall thicknesses are formed to be thicker than the thick-wall of the other portions of the cylinder of the rotor body portion 121A. The inclined thick-walled portions 128a and 128b respectively extend in a spiral form from the rear to the front of the rotor body portion 121A so as to be oriented forward, from the first rotor arm 210 side to the second rotor arm 220 side. The inclined thick-walled portion 128a and the inclined thick-walled portion 128b are formed in plane symmetry to each other, with respect to a surface that includes the cylinder axis S. More specifically, the inclined thick-walled portion 128a and the inclined thick-walled portion 128b are formed in plane symmetry to each other, with respect to a surface that includes the cylinder axis S and that passes the central portion of the first rotor arm 210 and the central portion of the second rotor arm 220.

As described above, since a particularly large load is applied to the first rotor arm 210 side of the rotor body portion 121A, the inclined thick-walled portions 128a and 128b preferably have such an orientation and arrangement, from the point of strength and rotational balance.

The wall thickness of the cylinder of the rotor body portion 121A, excluding the inclined thick-walled portions 128a and 128b, may be thinner than the wall thickness of cases in which the cylindrical portion of the rotor body portion 121A has a uniform thickness. While it is determined as a trade-off between strength and weight, the wall thicknesses of the inclined thick-walled portions 128a and 128b are preferably about 1.5 to 3 times the wall thickness of the cylinder portion besides the inclined thick-walled portions 128a and 128b. By disposing inclined thick-walled portions 128a and 128b on the cylinder and reducing the wall thickness of the other cylindrical portions, it is possible to reduce the overall weight of the rotor body portion 121A while maintaining the necessary strength.

In the second embodiment, the range in which the inclined thick-walled portions 128a and 128b are provided is a range that is on the rear side of the disk portion 122. However, the range in which the inclined thick-walled portions 128a and 128b are provided may be wider, or narrower.

In the second embodiment, inclined thick-walled portions 128a and 128b are formed as the second reinforcement portions, however, a reinforcement material having a higher strength than the cylindrical portion of the rotor body portion 121A may be adhered to the wall of the cylindrical portion as well. In addition, it is also possible to encapsulate a reinforcement material in the wall of the cylindrical portion. Such a reinforcement material is preferably provided inclined with respect to the cylinder axis S.

Meanwhile, it is not necessary to reduce the wall thickness of the cylinder of the rotor body portion 121A on the first rotor arm 210 side and the second rotor arm 220 side.

A method to provide a thick-walled portion in a direction that is parallel, or perpendicular, to the cylinder axis S direction is also conceivable as a method to reduce the overall thickness of the cylinder of the rotor body portion 121A while maintaining the overall strength by making a portion thereof thick walled. However, it has been found that providing inclined thick-walled portions 128a and 128b in an oblique direction with respect to the cylinder axis S direction achieves a higher effect of reducing the weight of the rotor body portion 121A while preventing a reduction in the strength of the rotor body portion 121A. Additionally, it has been found that it is effective to reduce the wall thickness across a wide range and to provide a reinforcement portion whereby the wall thickness is increased diagonally.

MODIFIED EXAMPLES

Figure 13A:
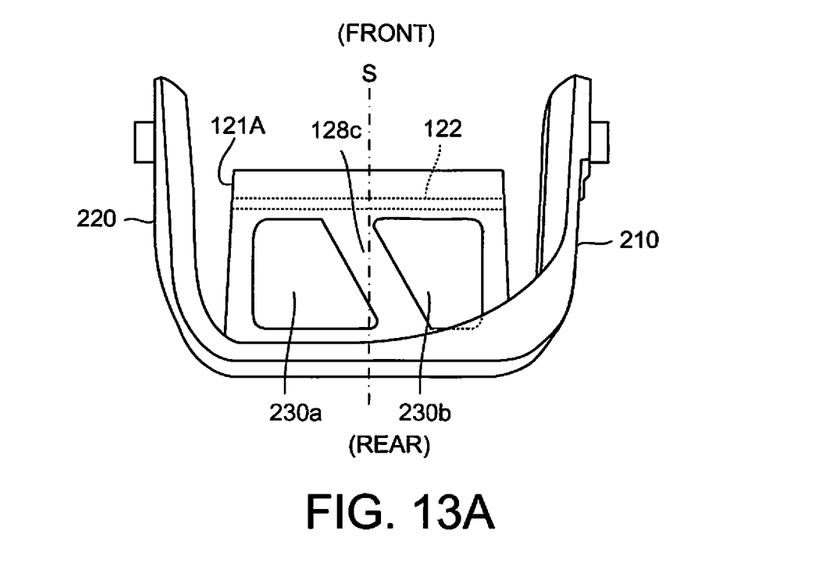
FIG. 13A is a side view of the rotor of a spinning reel for fishing according to a modified example of the present invention.
Figure 13B:
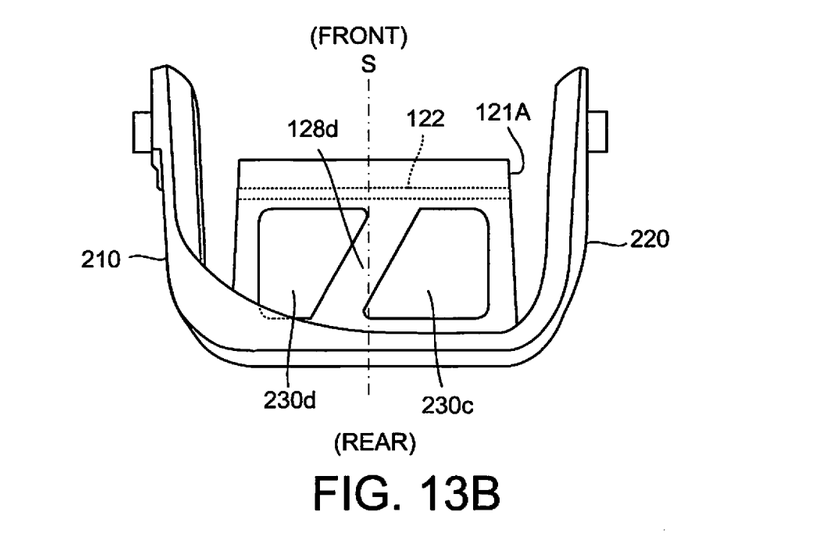
FIG. 13B is a side view seen from the opposite side.

The cylindrical portion of positions adjacent to the inclined thick-walled portions 128a and 128b in the second embodiment (not only directly adjacent positions, but also including nearby positions) may be (partially) open. For example, as in the rotor body portion 121A shown in FIG. 13A, an opening 230a and an opening 230b are disposed in the cylindrical portions between the first rotor arm 210 and the second rotor arm 220. As shown in FIG. 13B, an opening 230c and an opening 230d are also disposed in the opposite side in the same manner. That is, an inclined reinforcement portion 128c (second reinforcement portion) that extends inclined with respect to the cylinder axis S direction is provided, and an opening 230a and an opening 230b are disposed in adjacent positions thereof. Similarly, an inclined reinforcement portion 128d (second reinforcement portion) that extends inclined with respect to the cylinder axis S direction is provided, and an opening 230c and an opening 230d are provided in adjacent positions thereof. The wall thicknesses of the inclined reinforcement portions 128c and 128d are thicker than the wall thickness of cases in which the entire rotor body portion 121A has a uniform thickness. The inclined reinforcement portions 128c and 128d have the same role as the inclined thick-walled portions 128a and 128b of the second embodiment.

In the case of this modified example, the wall thickness of portions other than the openings may be the same. In this embodiment, it is possible to form an opening by punching a portion of a cylinder with a uniform wall thickness. In other words, large openings 230a, 230b, 230c, and 230d may be disposed in two cylindrical portions between the first rotor arm 210 and the second rotor arm 220 of the rotor body portion 121A, leaving behind inclined reinforcement portions 128c and 128d that extend in a direction that is inclined with respect to the cylinder axis S (longitudinal) direction. Meanwhile, it is preferable not to provide openings in the cylindrical portion to which the first rotor arm 210 is attached and the cylindrical portion to which the second rotor arm 220 is attached from the point of view of strength. The shape of the opening is substantially trapezoidal in the example shown in FIGS. 13A and 13B, but the shape is not limited to a trapezoid. However, when considering the rotational balance, the shape is preferably formed in plane symmetry with respect to a plane that includes the cylinder axis S and that passes the central portion of the first rotor arm 210 and the central portion of the second rotor arm 220.

By partially opening the cylindrical portions besides the inclined thick-walled portions 128a and 128b in the second embodiment in this manner, it is possible to reduce the weight of the rotor body portion 121A as a whole.

Conventionally, a method is known in which multiple small openings (for example circular openings) are used to reduce the weight of a plate-like member. However, it has been found that having openings across a wide range and to provide diagonal reinforcement portions to the openings is more effective to reduce the overall weight while maintaining the necessary strength.

Meanwhile, the thick-walled portion 127 of the first embodiment, the inclined thick-walled portions 128a and 128b of the second embodiment (or the inclined reinforcement portions 128c and 128d of the modified example) for reducing the weight of the rotor body portion 121 may each be selectively executed, or two or more may be executed in combination.

Several embodiments of the present invention and modified example thereof were described above. However, the present invention is not limited to these embodiments and modified example. In addition, of the characterizing configurations described above, one may be selectively (individually) executed, or a plurality of configurations may be combined, giving consideration to the rotational balance.

What is claimed is:

1. A spinning reel for fishing, comprising:
   a rotor having a cylindrical portion, and a first rotor arm and a second rotor arm disposed in mutually opposed positions on the cylindrical portion,
   a fishing line guiding mechanism having a line roller configured to guide a fishing line, a bail, a first bail support member supporting a first end of the bail, and a second bail support member supporting a second end of the bail, the first bail support member being coupled to the first rotor arm, and the second bail support member being coupled to the second rotor arm; and
   a bail reversing mechanism configured to invert the fishing line guiding mechanism to a line casting position or a line winding position,
   the line roller being disposed on the first bail support member and the bail reversing mechanism being disposed inside the second rotor arm, and
   the first rotor arm comprising two support legs that extend forwardly from an outer peripheral portion of the cylindrical portion.

2. The spinning reel for fishing recited in claim 1, further comprising
   a ribbed reinforcement portion extending from a side of at least one support leg to the outer peripheral portion of the cylindrical portion.

3. The spinning reel for fishing recited in claim 1, wherein
   the bail reversing mechanism comprises a return lever configured to return the second bail support member to the line winding position, and
   a return unit abutting a rear end portion of the return lever and configured to move the return lever, is disposed at a position on a front flange portion of a reel body that faces a rear end portion of the cylindrical portion to which a rod support portion extends.

4. The spinning reel for fishing recited in claim 3, wherein
   a biasing member abutting a front end of the return lever and configured to bias the return lever to the line winding position is disposed on the second bail support member.

5. The spinning reel for fishing recited in claim 1, wherein
   the bail reversing mechanism comprises a toggle spring and a guide rod configured to guide the toggle spring, and
   an insulating member is disposed in an engagement hole of the second bail support member, and engages one end portion of the guide rod to insulate a space between the guide rod and the engagement hole.

6. The spinning reel for fishing recited in claim 1, further comprising
   a rotor balance adjustment unit disposed on the first rotor arm on the outer peripheral portion of the cylindrical portion.

7. The spinning reel for fishing recited in claim 1, further comprising
   a thick-walled reinforcement portion on an inner peripheral portion of the cylindrical portion in a position at which the first rotor arm is disposed, the thick-walled portion being thicker than a surrounding portion.

8. The spinning reel for fishing recited in claim 1, wherein
   an inclined reinforcement portion extending inclined with respect to a cylinder axis direction of the cylindrical portion is disposed on a side surface of the cylindrical portion.

* * * * *